(No Model.)
J. GANDOLFO.
APPARATUS FOR MANUFACTURING BICARBONATE OF SODA.
No. 279,145. Patented June 12, 1883.
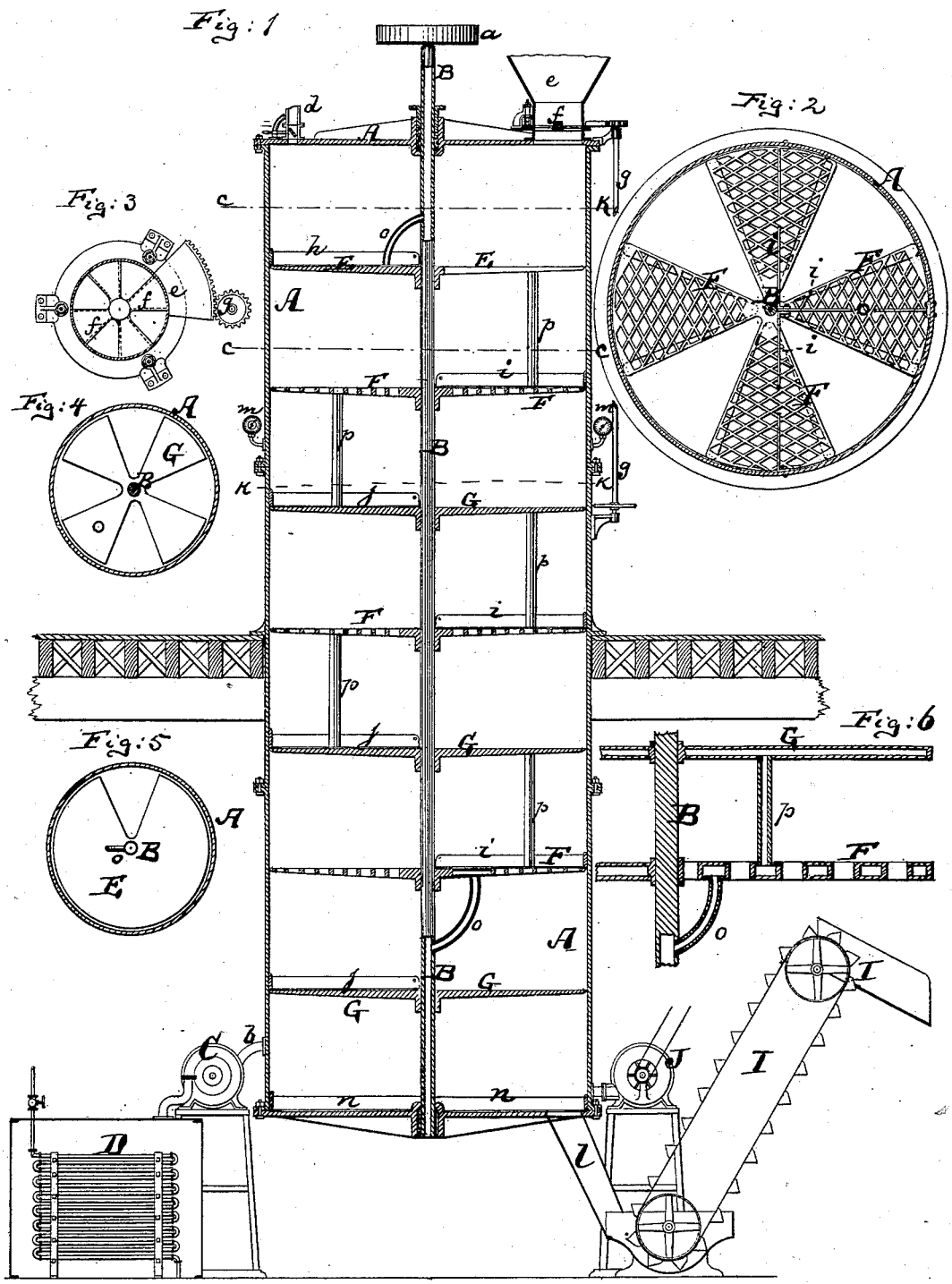
Witnesses:
John C. Tunbridge
Wiely G. ...
Inventor:
Joseph Gandolfo
by his attorneys
Briesen & Betts

UNITED STATES PATENT OFFICE.

JOSEPH GANDOLFO, OF NEW YORK, N. Y.

APPARATUS FOR MANUFACTURING BICARBONATE OF SODA.

SPECIFICATION forming part of Letters Patent No. 279,145, dated June 12, 1883.

Application filed September 22, 1882. (No model.)

*To all whom it may concern:*

Be it known that I, JOSEPH GANDOLFO, of New York, in the county and State of New York, have invented an Improved Apparatus for Manufacturing Bicarbonate of Soda, of which the following is a specification.

Figure 1 represents a vertical central section of my improved apparatus for manufacturing bicarbonate of soda. Fig. 2 is a horizontal section of the same, taken on the plane of the line $c\ c$, Fig. 1. Fig. 3 is a top view, partly in section, of the feed-hopper. Figs. 4 and 5 are horizontal sections on a reduced scale, taken, respectively, on the planes of the lines $k\ k$ and $c\ k$, Fig. 1. Fig. 6 is a vertical section, on an enlarged scale, of part of the central shaft and disks.

This invention relates to a new apparatus for bringing carbonate of soda or sal-soda into contact with carbonic-acid gas, so as to produce bicarbonate of soda.

The invention consists principally in combining, with a rotary series of shelves in a tank, on which shelves the carbonate of soda descends, mechanism for raising in the same structure a column of carbonic-acid gas.

The invention also consists in other details of construction and combinations that will be hereinafter more fully described.

In the drawings, the letter A represents the tank of the apparatus, the same being a vessel of cylindrical or other convenient form, made of sheet metal or other suitable substance, and placed stationarily upon a suitable frame-work. Through this vessel A extends a vertical shaft, B, to which rotary motion can be imparted by a belt taking hold of a pulley, $a$, or by any other suitable mechanism. The lower part of the tank or vessel A communicates by a pipe, $b$, with a blower or injector, C, which communicates with a reservoir, D, and during the operation of the apparatus serves to force carbonic-acid gas into the tank A, so that it will be under a pressure of about ten pounds to the square inch in said tank A. The upper part of the tank A has a safety-valve, $d$, and also a supply-hopper, $e$. Into this supply-hopper is placed the carbonate of soda or sal-soda, which is to be converted. The hopper has a suitable valve or gate, $f$, which, when moved by means of a shaft, $g$, gearing into it, as indicated in Figs. 1 and 3, will allow the proper quantity of its contents to drop into the tank below. Upon the shaft B, within the tank A, are mounted a series of disks, E F G. The uppermost disk, E, which is also shown in Fig. 5, is nearly solid, but has one opening through it. The disks F F are made of perforated blades or wings, as more clearly shown in Fig. 2, and between the wings have open spaces. The disks G G, more clearly shown in Fig. 4, have solid wings and spaces between them.

In operation the sal-soda or carbonate of soda, being fed from the hopper into the upper part of the tank or vessel A, drops first upon the disk E and is carried around by said disk until it meets a stationary wiper, $h$, secured in said tank, which wiper causes the charge on the disk E to drop down upon the perforated disk F below. Here whatever lands or remains on said disk F is carried round until swept off by another stationary wiper, $i$, and falls upon the disk G below, which in turn also subjects its charge to the action of a wiper, $j$, and so on, thus insuring a partial detention, a gradual subdivision, and slow descent of the charge from the hopper. During this descent the charge meets the column of carbonic-acid gas, which is injected under pressure by the blower C, and is thus gradually converted into bicarbonate of soda. The perforated shelves F F allow the gas to affect the charge resting on them, and they also serve as sieves to insure a more perfect separation into fine particles of the solid charge. The gases resulting from the combination of the carbonate of soda with the carbonic-acid gas, and all other surplus gases, will finally escape through the valve $d$; but the main charge of carbonic-acid gas, being heavier than the atmosphere, will constitute a column resting on the lower end of the tank. The bicarbonate of soda resulting finally from the mixture of the gas with the carbonate of soda will be discharged at the lower part of the tank A by a rotating wiper, $n$, into a spout, $l$, and thence taken up by an elevator, I, to be carried, if desired, into a similar apparatus to that herein shown, where warm air may be blown in by the blower to dry the bicarbonate of soda fed in through the hopper. Should too much heat be created in the tank A, in which the carbonate of soda is mixed with carbonic-acid gas, cold air may be forced into it by a blower, J, so that the temperature should not exceed the proper normal degree, an indicator, m, to that effect being secured to the tank. Another or additional way of cooling the contents of the tank A is to make the ends of the shaft B hollow, and connect these hollow parts by branches o p with the several disks, F G, which, in that case, would be made hollow, as is more clearly shown in Fig. 6. Thus the water would be inserted, say, at the lower part of the hollow shaft B, pass upward through the several disks, and finally escape into and from the upper hollow part of the shaft B.

By the use of this apparatus great loss of time heretofore occasioned in the making of bicarbonate of soda will be avoided. The operation of mingling the two chemicals will take place rapidly and will result in no appreciable waste, while heretofore, when the chemicals were united on stationary apparatus, imperfect union usually took place, and an undue length of time was consumed in effecting even that imperfect union.

I claim—

1. In apparatus for making bicarbonate of soda, the tank A, having hopper e and discharge-outlet l, combined with the rotary shaft B, having rotating carrying-disks with apertures through them, and with the blower C, substantially as herein shown and described.

2. The combination of the air-blower J with the tank A, having shaft B, carrying-disks with apertures therein, and with the gas-blower C, for operation as described.

3. In the tank A, the combination thereof with the shaft B, having hollow ends, and with the tubular branches o p, and disks F G, for operation substantially as described.

JOSEPH GANDOLFO.

Witnesses:
WILLY G. E. SCHULTZ,
WILLIAM H. C. SMITH.